United States Patent [19]

Sasaki et al.

[11] Patent Number: 4,682,186
[45] Date of Patent: Jul. 21, 1987

[54] METHOD FOR FORMING A COLOR IMAGE

[75] Inventors: Takashi Sasaki, Tokyo; Nobuaki Sakurada, Yokohama; Hideaki Kawamura, Tokyo, all of Japan

[73] Assignee: Canon Kabushiki Kaisha, Tokyo, Japan

[21] Appl. No.: 664,763

[22] Filed: Oct. 25, 1984

[30] Foreign Application Priority Data

Nov. 4, 1983 [JP] Japan ................................ 58-207770

[51] Int. Cl.⁴ ..................... G01D 15/18; H04N 1/46; G03F 3/08
[52] U.S. Cl. ................................. 346/140 R; 358/75; 358/80
[58] Field of Search .................... 346/140 PD; 358/75, 358/80

[56] References Cited

U.S. PATENT DOCUMENTS

| | | | |
|---|---|---|---|
| 4,060,829 | 11/1977 | Sakamoto | 358/80 |
| 4,096,519 | 6/1978 | Hoffrichter et al. | 358/80 X |
| 4,189,742 | 2/1980 | Klopsch | 358/80 |
| 4,396,940 | 8/1983 | Tanaka et al. | 358/80 |
| 4,410,909 | 10/1983 | Ueda et al. | 358/80 X |
| 4,446,470 | 5/1984 | Sugiyama et al. | 346/140 PD |
| 4,481,532 | 11/1984 | Clark et al. | 358/80 |
| 4,500,919 | 2/1985 | Schreiber | 358/80 X |

Primary Examiner—George H. Miller, Jr.
Attorney, Agent, or Firm—Fitzpatrick, Cella, Harper & Scinto

[57] ABSTRACT

A method for forming a color image by using a plurality of coloring materials and controlling quantities of the coloring materials in each pixel to form different colors is disclosed. When a density to be reproduced for at least one of the coloring materials exceeds a density reproducible for that coloring material, the quantities of other coloring materials are reduced.

12 Claims, 7 Drawing Figures

Fig. IA
PRIOR ART
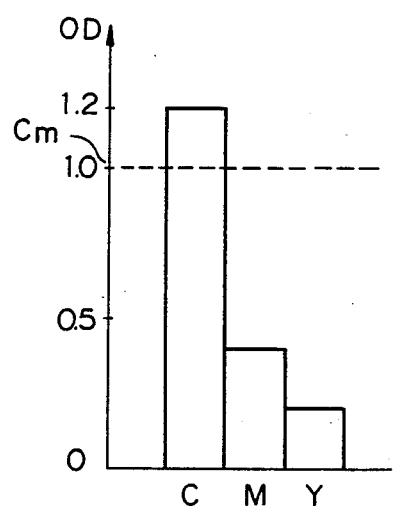
Fig. IB
PRIOR ART
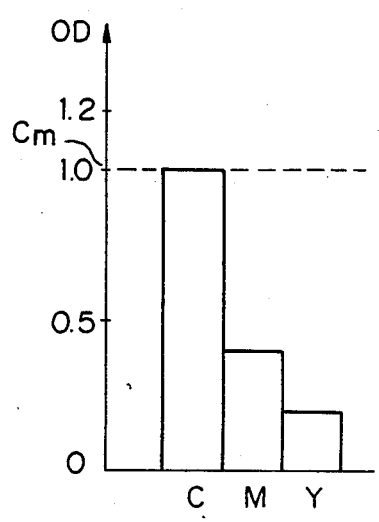

METHOD FOR FORMING A COLOR IMAGE

BACKGROUND OF THE INVENTION

1. Field of the Invention

The present invention relates to a method for forming a color image by a plurality of coloring materials, and more particularly to a method for forming a color image of different colors by controlling quantities of coloring materials in each pixel.

2. Description of the Prior Art

In a prior art color printer or color scanner, tonality correction and masking are effected for R, G and B color signals, and quantities of coloring materials (cyan, magenta, yellow, black) to be deposited on a paper are controlled to control reflection optical densities (hereinafter referred to as OD) of the respective coloring materials to form a color image.

In such an apparatus, it is desirable that a very high density area can also be reproduced. However, because of a limitation to the density of the coloring material and a limitation to quantities of coloring materials deposited in one pixel area, only a definite OD value can be actually reproduced on the paper.

In the prior art, when signals having OD values as shown in FIG. 1A are obtained through image processing including tonality correction and masking, that is, when the OD value for cyan exceeds a maximum OD value reproducible by the cyan coloring material, the cyan is reproduced with the maximum reproducible OD value while magenta and yellow are reproduced with the OD values provided by the image processing unit, as shown in FIG. 1B. In accordance with the prior art method, however, a total balance of cyan, magenta and yellow is lost and a hue will change. In the example of FIG. 1, a clear blue color appears as muddy blue.

SUMMARY OF THE INVENTION

It is an object of the present invention to provide a method for forming a color image which can suppress a change of hue even when a density to be reproduced for one of coloring materials exceeds a density reproducible by the coloring material.

Other objects of the present invention will be apparent from the following description of the invention and the appended claims.

BRIEF DESCRIPTION OF THE DRAWINGS

FIGS. 1A and 1B illustrate prior art.

DETAILED DESCRIPTION OF THE PREFERRED EMBODIMENTS

In the following description of the preferred embodiment, an ink jet printer is specifically described although the present invention is not limited to it but it is applicable to any color image forming apparatus in which quantity of coloring materials in one pixel area is limited, or a reproducible color density is limited.

Figure 2:
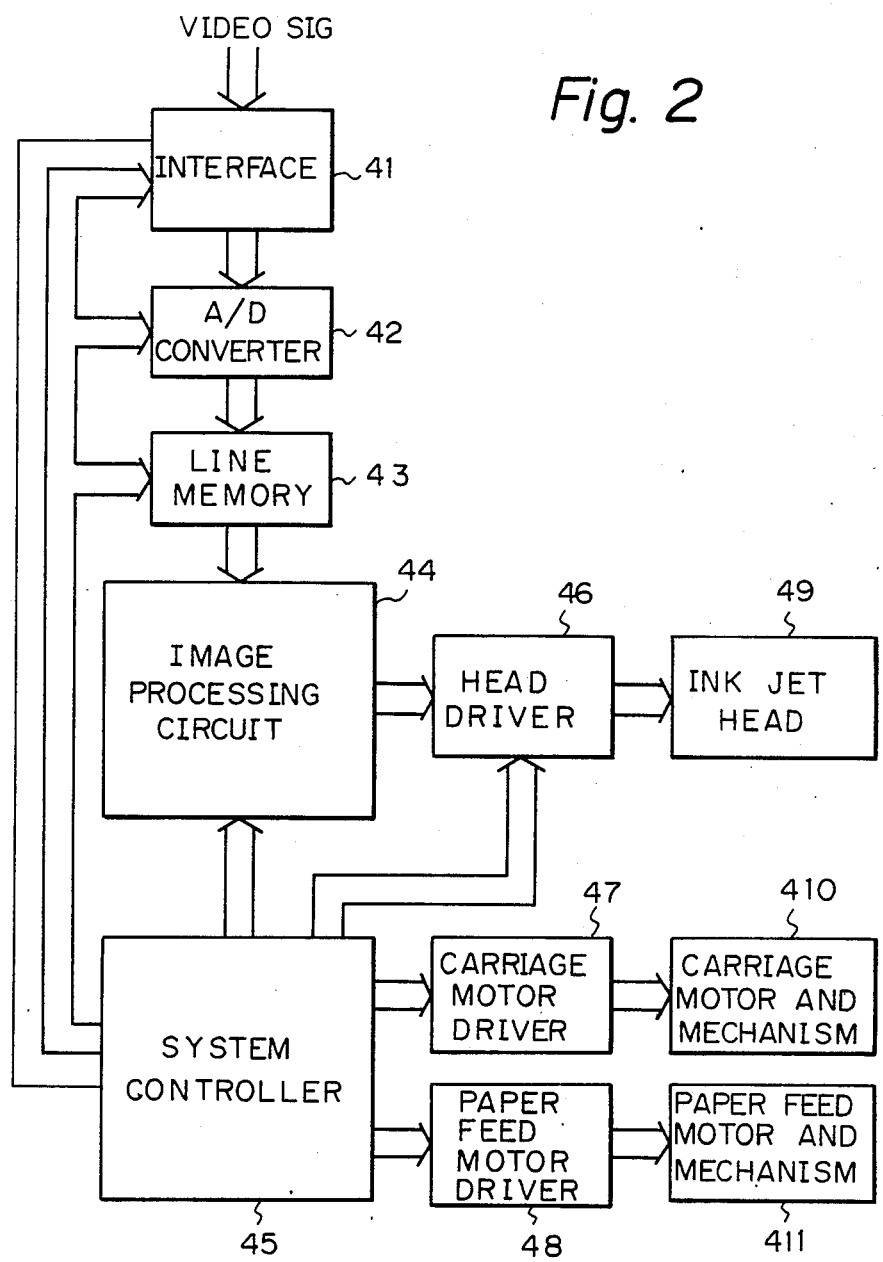
FIG. 2 is a block diagram of an ink jet printer.

FIG. 2 is a block diagram of an ink jet printer in accordance with one embodiment of the present invention.

An image video signal such as a composite video signal containing R, G and B color signals and a synchronizing signal is applied to a video signal interface 41. The signal is synchronized thereby, and sampled and held by a sample/hold circuit. The signal is then supplied to an A/D converter 42 and tonality signals of the R, G and B image signals are converted to digital signals. An appropriate number of lines of such digital signals are stored in a line memory 43. The line normally extends vertically although it may extend horizontally. The data in the line memory is processed by an image processing circuit 44 for each pixel for color conversion, $\gamma$-conversion, masking and undercolor elimination, and usually converted to cyan, magenta, yellow and black signals, then to voltages to be applied to heads, which are then supplied to a head driver 46.

An ink jet head 49 discharges a quantity of ink corresponding to the applied voltage. A hue and a density are represented by the quantities of inks of respective colors.

A system controller 45 which controls an operation sequence of a printer generates a head drive signal, a carriage motor drive signal and a paper feed signal in timed relation with the input image signal. Those signals are supplied to the head driver 46, a carriage motor driver 47 and a paper feed motor driver 48, respectively, and the ink jet head 49, a carriage motor and its mechanism 410 and a paper feed motor and its mechanism 411 are controlled at the predetermined timing so that the image of the input image signals is transferred to a record medium.

Figure 3:
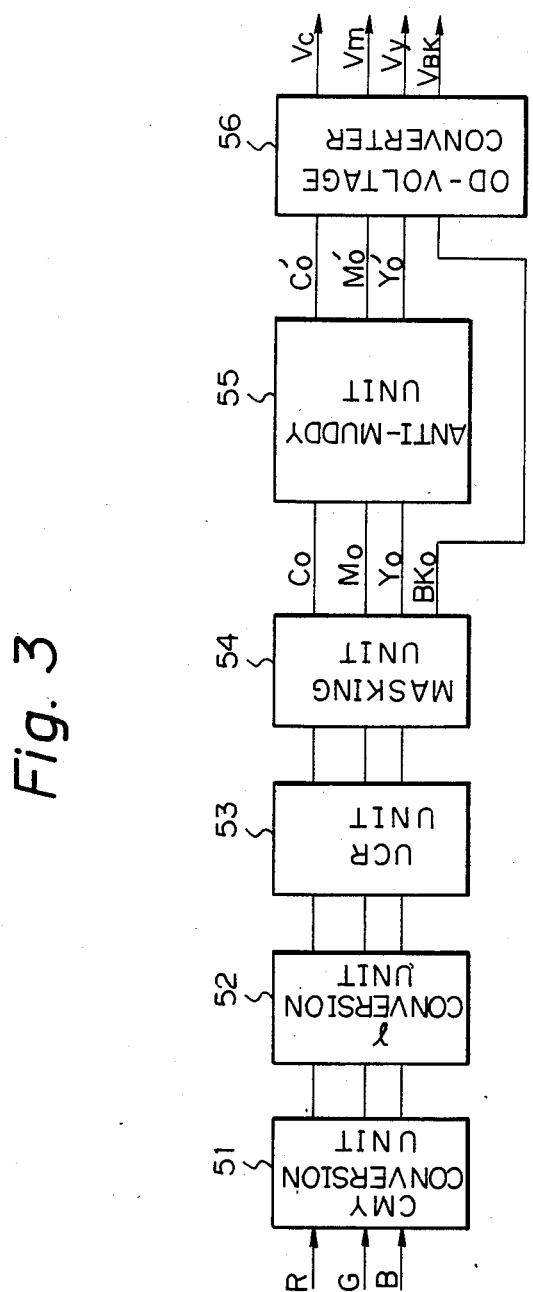
FIG. 3 is a circuit diagram of an image processing circuit.

FIG. 3 is a block diagram of the image processing circuit 44. R, G and B color signals for a pixel are converted to C, M and Y color signals by a CMY conversion unit 51, and $\gamma$-converted by a $\gamma$-conversion unit 52. A UCR unit 53 detects black components in the C, M and Y color signals to determine a BK level. If the BK level is higher than a predetermined level, the UCR unit 53 produces a BK signal so that the C, M and Y signals are reduced by the BK signal. Then, color correction is made by a masking unit 54. Outputs Co, Mo and Yo from the masking unit 54 indicate OD values to be reproduced. They are supplied to an anti-muddy unit 55. If the input OD values Co, Mo and Yo to the anti-muddy unit 55 are smaller than maximum reproducible OD values for the respective colors, the anti-muddy units 55 outputs the input OD values as they are. However, if at least one of the input OD values is larger than the maximum reproduciable OD value, the anti-muddy unit 55 converts the input OD values and supplies the converted OD values Co', Mo' and Yo' to an OD value-voltage conversion unit 56. Since the black does not directly effect to the hue, the output signal BKo from the masking unit 54 is directly supplied to the conversion unit 56.

The OD value - voltage conversion unit 56 converts the converted OD values Co', Mo' and Yo' of the respective colors and the OD value BKo of the black to ink jet head drive voltages $V_C$, $V_M$, $V_Y$ and $V_{BK}$ of the respective colors, and those voltages are supplied to the head driver 46 of FIG. 2.

Figure 4:
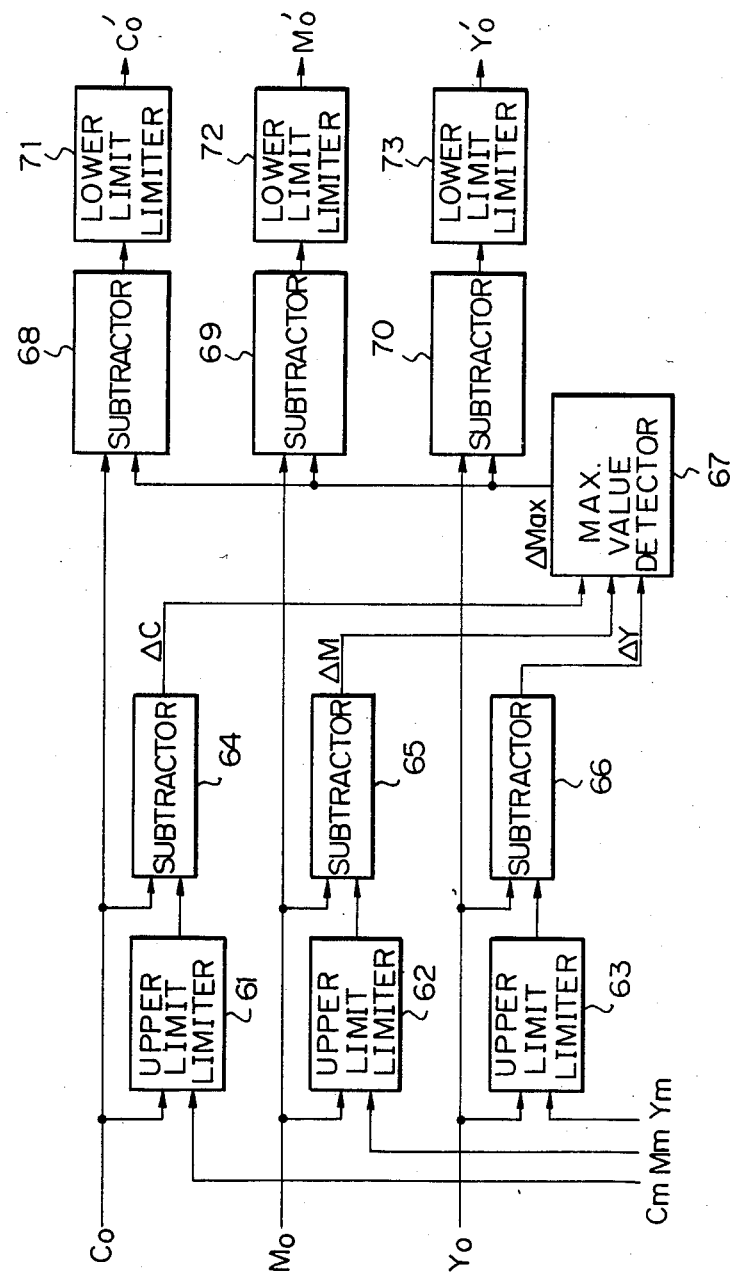
FIG. 4 is a circuit diagram of an anti-muddy circuit.

FIG. 4 shows a detail of the anti-muddy unit 55. The input OD values Co, Mo and Yo are supplied to upper limit limiters 61, 62 and 63. When the input OD value Co, Mo and Yo exceed maximum OD values Cm, Mm and Ym, respectively, the maximum values are outputted, and when the input OD values Co, Mo and Yo are smaller than Cm, Mm and Ym, the input OD values Co, Mo and Yo are outputted as they are. The outputs of the upper limit limiters 61, 62 and 63 are applied to subtractors 64, 65 and 66, respectively, where differences $\Delta C$, $\Delta M$ and $\Delta Y$ from the input OD values Co, Mo and Yo are calculated. A maximum value $\Delta$Max of $\Delta C$, $\Delta M$ and $\Delta Y$ is determined by a maximum value detector 67.

The above processing is illustrated below.

| | |
|---|---|
| If Co > Cm | $\Delta C$ = Co − Cm |
| If Co ≦ Cm | $\Delta C$ = 0 |
| If Mo > Mm | $\Delta M$ = Mo − Mm |
| If Mo ≦ Mm | $\Delta M$ = 0 |
| If Yo > Ym | $\Delta Y$ = Yo − Ym |
| If Yo ≦ Ym | $\Delta Y$ = 0 |
| $\Delta$Max = Max ($\Delta C$, $\Delta M$, $\Delta Y$) | |

The $\Delta$Max is substracted from the input OD values Co, Mo, and Yo, respectively, by subtractors 68, 69 and 70. Then, in lower limit limiters 71, 72 and 73, an OD value lower than a minimum reproducible OD value is converted to the minimum reproduciable OD value, and the converted OD values Co', Mo' and Yo' are supplied to the OD values - voltage conversion unit 56 of FIG. 3.

Figure 5A:
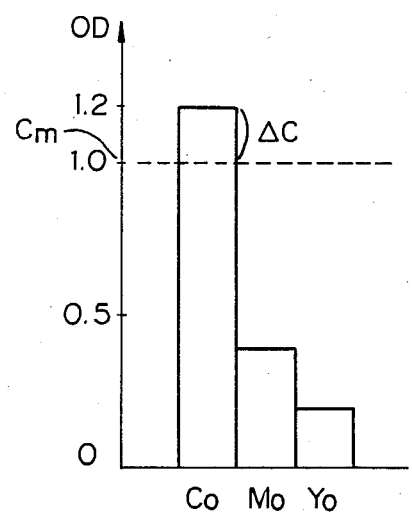
FIGS. 5A and 5B illustrate the present invention.
Figure 5B:
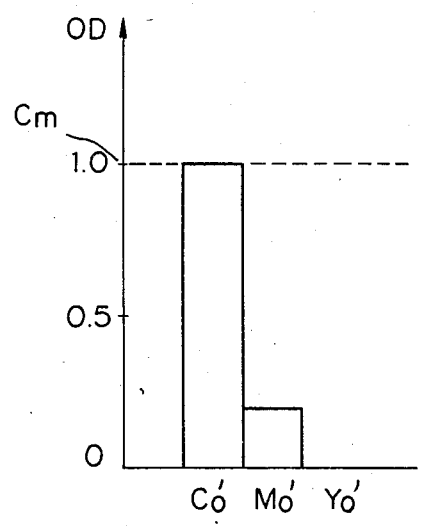

FIG. 5 shows an example of Co, Mo and Yo conversion processing in the present embodiment. When the input OD value Co for cyan exceeds the maximum OD value Cm (FIG. 5A), $\Delta C$ is subtracted from Mo and Yo so that converted OD values Co', Mo' and Yo' as shown in FIG. 5B are produced.

In another example, $Co' = Co - \alpha \Delta Max$ $Mo' = Mo - \beta \Delta Max$ $Yo' = Yo - \gamma \Delta Max \ (0 \leq \alpha, \beta, \gamma \leq 1)$ Namely, the $\Delta$Max is subtracted for the saturated color and coefficients between 0 and 1 are magnified for other two colors.

In the present embodiment, the anti-muddy unit, the masking unit and the UCR unit are provided, and when the OD value larger than the maximum OD value is applied to the anti-muddy unit, the difference is subtracted. Alternatively, the subtracted values may be stored in the memory and they may be retrieved by addressing by the input OD values. Namely, the masking unit, the UCR unit and the anti-muddy unit may be constructed by one look-up table.

In this manner, when $\Delta$Max is larger than zero, that is, when at least one of the input OD values Co, Mo and Yo is larger than the maximum OD values Cm, Mm and Ym, respectively, the OD value for the saturated color is limited to the maximum OD value and the OD values for the unsaturated colors are also reduced so that the reproduction of color image with different hue is prevented.

A method for forming a color image by using a plurality of coloring materials to form desired colors is thus disclosed. The desired colors can be formed by controlling the quantities of the coloring materials in each pixel area. When the desired density of one of the colors exceeds the reproducible density of its respective coloring material, the quantities of the other coloring materials are reduced. Accordingly, non-muddy clear color image is reproduced.

When $\Delta$Max is zero, the input OD values are outputted as they are so that a color image having desired hue, color and brightness is reproduced.

In the present embodiment, the density of each pixel, that is, the quantities of the coloring materials in each pixel area are controlled by the applied voltages to the heads, that is, the dot size. Alternatively, it may be controlled by the number of dots printed in each pixel area.

As described hereinabove, according to the present invention, even if at least one of the plurality of color signals includes non-reproducible density, the change of hue in the overall printout is prevented so that a high quality of color image not different from the hue of the original color image is reproduced.

The present invention is not limited to the illustrated embodiment but various modifications may be made within a scope of the appended claims.

What is claimed is:

1. A method for forming a color image, comprising the steps of:

supplying a plurality of color signals which represent respective colors providing a plurality of coloring materials respectively corresponding to each of said plurality of color signals, wherein the level of each said signal corresponds to an amount of coloring material used to represent the respective color;

detecting whether any said color signal exceeds a predetermined level corresponding to the maximum amount of coloring material capable of representing the respective color;

converting the color signals such that the levels of said converted signals are suppressed only when said detecting step detects a color signal which exceeds said predetermined level, wherein said level of said detected color signal is not suppressed below said predetermined level; and variably controlling the respective amounts of said coloring materials to form a color image in response to said converted color signals.

2. A method for forming a color image according to claim 1 wherein said respective amounts of said coloring materials are reduced by a quantity less than the amount which said level of said detected color signal exceeds said predetermined level such that the hue of the reproduced color image is substantially unaffected.

3. A method for forming a color image according to claim 1 wherein the amounts of said coloring materials formed in each pixel area are limited.

4. A method for forming a color image according to claim 1 wherein said coloring materials are inks.

5. A method for forming a color image according to claim 1 wherein said color image is formed by dots of different colors formed by ink jet heads.

6. A method for forming a color image according to claim 5 wherein said ink jet heads discharge variable quantities of inks.

7. A method for forming a color image according to claim 1 wherein said coloring materials include at least cyan, magenta, yellow and black coloring materials.

8. A method for forming a color image according to claim 1 also including the step of eliminating a black component, wherein the densities of said respective amounts of said coloring materials are reduced after the elimination of said black component.

9. A color image signal processing method for reproducing a color image, comprising the steps of:

supplying a plurality of color signals which represent respective colors, wherein the level of each said signal corresponds to an amount of coloring material used to represent the respective color;

detecting whether any said color signal exceeds a predetermined level corresponding to the maximum amount of coloring material capable of representing the respective color; and reducing the levels of said color signals to restrict the respective amounts of coloring materials to be used only when said detecting step detects a color signal which exceeds said predetermined level.

10. A method according to claim 9, wherein said reducing step includes reducing said color signals, except said level of said detected color signal is not reduced below said predetermined level.

11. A method according to claim 10, wherein said reducing step includes reducing the levels of the non-detected color signals by an amount less than the amount which said level of said detecting color signal exceed said predetermined level such that the hue of the reproduced color image is substantially unaffected.

12. A method according to claim 9, wherein said coloring materials include at least cyan, magenta, yellow and black coloring materials.

* * * * *

UNITED STATES PATENT AND TRADEMARK OFFICE
CERTIFICATE OF CORRECTION

PATENT NO. : 4,682,186  
DATED : July 21, 1987  
INVENTOR(S) : TAKASHI SASAKI, ET AL.

Page 1 of 2

It is certified that error appears in the above-identified patent and that said Letters Patent is hereby corrected as shown below:

COLUMN 2

Line 49, "reproduciable" should read --reproducible--.  
Line 53, "to" should be deleted.  
Line 64, "value" should read --values--.

COLUMN 3

Line 17, "substracted" should read --subtracted--.  
Line 21, "reproduciable" should read --reproducible--.  
Line 24, "values - voltage" should read --value - voltage--.  
Line 37, "$\Delta Max(0 \leq \alpha, \beta, \gamma \leq 1)$" should read --$\Delta Max\ (0 \leq \alpha, \beta, \gamma \leq 1)$--.

COLUMN 4

Line 18, "a" should read --the--.  
Line 23, "colors" should read --colors;--.

UNITED STATES PATENT AND TRADEMARK OFFICE
CERTIFICATE OF CORRECTION

PATENT NO. : 4,682,186
DATED : July 21, 1987
INVENTOR(S) : TAKASHI SASAKI, ET AL.

It is certified that error appears in the above-identified patent and that said Letters Patent is hereby corrected as shown below:

COLUMN 6

Line 8, "detecting" should read --detected--.
Line 9, "exceed" should read --exceeds--.

Signed and Sealed this

First Day of December, 1987

Attest:

DONALD J. QUIGG

Attesting Officer

Commissioner of Patents and Trademarks